United States Patent
Kobayashi et al.

(10) Patent No.: US 7,474,822 B2
(45) Date of Patent: Jan. 6, 2009

(54) OPTICAL FIBER COLLIMATOR

(75) Inventors: Shigeru Kobayashi, Tokyo (JP); Takehiro Hayashi, Kanagawa (JP)

(73) Assignee: Tyco Electronics AMP K.K., Kanagawa-ken (JP)

( * ) Notice: Subject to any disclaimer, the term of this patent is extended or adjusted under 35 U.S.C. 154(b) by 0 days.

(21) Appl. No.: 11/683,991

(22) Filed: Mar. 8, 2007

(65) Prior Publication Data
US 2008/0080812 A1    Apr. 3, 2008

(30) Foreign Application Priority Data
Mar. 10, 2006   (JP)   ............... 2006-066183

(51) Int. Cl.
G02B 6/32    (2006.01)
G02B 6/36    (2006.01)

(52) U.S. Cl. .......................................... 385/35; 385/93
(58) Field of Classification Search ................. 385/31, 385/33, 35, 36, 79, 88, 93
See application file for complete search history.

(56) References Cited

U.S. PATENT DOCUMENTS

| | | | |
|---|---|---|---|
| 4,378,954 A * | 4/1983 | Baker ........................... | 385/80 |
| 4,632,505 A * | 12/1986 | Allsworth .................... | 385/61 |
| 4,781,431 A | 11/1988 | Wesson et al. | |
| 4,830,453 A * | 5/1989 | Khoe ............................ | 385/35 |
| 5,094,518 A * | 3/1992 | Musk ............................ | 385/35 |
| 5,293,438 A * | 3/1994 | Konno et al. .................. | 385/35 |
| 5,355,084 A * | 10/1994 | Okajima et al. ............ | 324/244.1 |
| RE34,790 E * | 11/1994 | Musk ............................ | 385/93 |
| 5,394,493 A * | 2/1995 | Ames ............................ | 385/35 |
| 5,434,940 A * | 7/1995 | Roff et al. ..................... | 385/91 |
| 6,031,947 A | 2/2000 | Laor | |
| 6,736,550 B1 | 5/2004 | Wang et al. | |
| 7,121,735 B2 * | 10/2006 | Jitsuno et al. ................. | 385/79 |
| 7,142,747 B2 * | 11/2006 | Oosterhuis et al. ........... | 385/26 |
| 2004/0051863 A1 | 3/2004 | Tsien et al. | |
| 2004/0247242 A1 | 12/2004 | Blasingame et al. | |

FOREIGN PATENT DOCUMENTS

JP    05-113519    5/1993
JP    2004-302453    10/2004

* cited by examiner

*Primary Examiner*—Kevin S Wood
*Assistant Examiner*—John M Bedtelyon
(74) *Attorney, Agent, or Firm*—Barley Snyder LLC

(57) ABSTRACT

In the optical fiber collimator according to the invention, a transparent block having a refractive index that is substantially the same as the refractive indices of the lens and optical fiber is disposed between the lens and ferrule so that the block contacts the lens, ferrule, and optical fiber. The thickness of the block in the direction of beam transmission is set to be the same as the distance to the focal point from the end surface of the lens that is determined by the diameter and refractive index of the lens and the refractive index of the block.

18 Claims, 4 Drawing Sheets

OPTICAL FIBER COLLIMATOR

CROSS-REFERENCE TO RELATED APPLICATIONS

This application claims the benefit of the filing date under 35 U.S.C. § 119(a)-(d) of Japanese Patent Application No. 2006-66183, filed Mar. 10, 2006.

FIELD OF THE INVENTION

The present invention relates to a passive fiber optical device and more particularly to fiber optic collimator.

BACKGROUND

When high-speed large-capacity optical fiber communication systems are built, numerous optical devices are used. Such devices include devices that extract an optical signal of an arbitrary wavelength from an optical signal obtained by multiplexing a plurality of wavelengths, devices that use an optical crystal for matching the phase of the optical signal, and the like, and numerous optical fiber collimators which convert an optical signal emitted and spread from an optical fiber into parallel beams or which cause parallel beams to collect in an optical fiber.

The main function of such optical fiber collimators is to propagate parallel beams for a desired distance without attenuation. Low insertion loss and high return loss are generally desired.

In order to realize such low insertion loss and high return loss, methods are often used in which anti-reflective coatings are provided on the entire lens surface and the end surface of an optical fiber. Alternatively, the end surface of an optical fiber close to a lens is diagonally disposed in order to obtain a higher return loss such that the reflected beam is reflected to the outside from the optical fiber core.

The optical fiber collimator shown in FIG. 4 (see JP-A-2004-302453), for example, has been known as a conventional optical fiber collimator of this type in which the end surface of the optical fiber is diagonally disposed. The optical fiber collimator 101 shown in FIG. 4 comprises a partially spherical lens 102 that has beam-transmitting spherical surfaces 102a having the same radius of curvature at both ends of the cylindrical part, a tube 103 which contains an optical fiber 104 whose end surface 104a is inclined, and an eccentric sleeve 105 that has an passageway 105a for attaching the partially spherical lens 102 and tube 103. Furthermore, the central axis Z of the parallel beam emitted from the partially spherical lens 102 is within a radial range of 0.02 mm centered on the central axis B of the outer circumferential surface of the eccentric sleeve 105, and has an angle of 0.2° or less with respect to the central axis B of the outer circumferential surface of the eccentric sleeve 105.

With this optical fiber collimator 101, a high return loss can be obtained because the end surface 104a of the optical fiber 104 is inclined. Here, if the end surface 104a of the optical fiber 104 is inclined, the following problem arises: namely, a beam is emitted from the end surface 104a of the optical fiber 104 in a diagonal direction with respect to the central axis A of the partially spherical lens 102 in accordance with the law of refraction; as a result, in the parallel beam emitted from the partially spherical lens 102, an eccentricity δ is generated between the central axis Z of this parallel beam and the central axis A of the partially spherical lens 102. When an eccentricity δ is generated between the central axis Z of the parallel beam and the central axis A of the partially spherical lens 102, in cases where mutually facing optical fiber collimators are aligned with reference to the external diameter, a lack of alignment of the central axis Z of the parallel beams becomes a problem. However, in the case of the optical fiber collimator 101 shown in FIG. 4, because the central axis Z of the parallel beam emitted from the partially spherical lens 102 is within a radial range of 0.02 mm centered on the central axis B of the outer circumferential surface of the eccentric sleeve 105, and has an angle of 0.2° or less with respect to the central axis B of the outer circumferential surface of the eccentric sleeve 105, in cases where mutually facing optical fiber collimators 101 are aligned with reference to the external diameter, the central axes Z of the parallel beams substantially coincide.

However, it is difficult to set the optical axis Z of the parallel beam emitted from the partially spherical lens 102 within a radial range of 0.02 mm centered on the central axis B of the outer circumferential surface of the eccentric sleeve 105, and also within an angle of 0.2° with respect to the central axis B of the outer circumferential surface of the eccentric sleeve 105. Therefore, there is a problem in that the central axes Z of the parallel beams may not coincide in cases where mutually facing optical fiber collimators 101 are aligned with reference to the external diameter.

In contrast, the device shown in FIG. 5 (see the specification of U.S. Pat. No. 5,384,874), for example, has been known as an optical fiber rod lens device which realizes a low insertion loss and high return loss, and which eliminates the eccentricity of the central axis of parallel beam emitted from the lens with respect to the central axis of the lens. FIG. 5 is a diagram showing the basic construction of a conventional optical fiber rod lens device.

The optical fiber rod lens device 201 shown in FIG. 5 comprises an optical fiber 202 consisting of a core 202a and a cladding 202b surrounding the core 202a, and a convergent rod lens 203 connected to the end surface of the optical fiber 202. Furthermore, the optical fiber 202 and rod lens 203 are designed to be connected to each other by fusion such that the central axes of these parts are aligned with each other.

With this optical fiber rod lens device 201, because the optical fiber 202 and rod lens 203 are connected to each other by fusion such that the central axes of these parts are aligned with each other, it is possible to realize a low insertion loss and high return loss and to eliminate the eccentricity of the central axis of parallel beam emitted from the lens with respect to the central axis of the lens.

However, in this optical fiber rod lens device 201, because the optical fiber 202 and rod lens 203 are connected to each other by fusion, the need for a large-scale manufacturing apparatus such as a $CO_2$ laser and arc discharge apparatus is a problem.

In contrast, the optical connector shown in FIGS. 6A and 6B (see JP-A-5-113519), for example, has been known as an optical connector which realizes a low insertion loss and high return loss, which eliminates the eccentricity of the central axis of parallel beam emitted from the lens with respect to the central axis of the lens, and which does not require any large-scale manufacturing apparatus. FIGS. 6A and 6B show a conventional optical connector; FIG. 6A is a sectional view, and FIG. 6B is an explanatory diagram of the optical connector in a use state.

The optical connector 301 shown in FIG. 6A comprises a connector main body 310, an optical fiber 320, and a spherical lens 330. The connector main body 310 is formed from an opaque resin or the like. The connector main body 310 is provided with a circular conic opening 311 that holds the lens 330, an optical fiber receiving opening 312 that is bored so that its central axis coincides with the central axis of the circular conic opening 311, and alignment openings 313 that are used during mating with a mating optical connector 301 (see FIG. 6B). Furthermore, the optical fiber 320 is inserted into the optical fiber receiving opening 312 from the opposite side of the circular conic opening 311, and is fastened in place by an adhesive. The fastening of the optical fiber 320 is accomplished so that the position of the end of the optical fiber 320 is at the focal point of the optical system that is determined by the diameter and refractive index of the lens 330 and the refractive index of a photocurable resin 340 (described later). Moreover, the silicone buffer 321 and jacket 322 of the optical fiber 320 are also bonded and fastened to the connector main body 310.

Meanwhile, a transparent photocurable resin 340 having substantially the same refractive index as those of the optical fiber 320 and lens 330 is injected into the circular conic opening 311, and the lens 330 is inserted on top of this so that this lens 330 contacts the wall of the circular conic opening 311, thus fastening this lens in place by photocuring of the photocurable resin.

As is shown in FIG. 6B, this optical connector 301 is positioned, abutted, and fastened to the mating connector 301 by the alignment openings 313 and guide pins 314. Furthermore, a beam emitted from the optical fiber 320 of one optical connector 301 passes through the transparent photocurable resin 340, is converted into parallel beams by the lens 330, enters the lens 330 of the other mating optical connector 301, is focused by this lens, further passes through the photocurable resin 340, and is caused to converge at the end surface of the optical fiber 320.

In this optical connector 301, because the optical fiber 320 and lens 330 are fastened by the transparent photocurable resin 340 having substantially the same refractive index as those of the optical fiber 320 and lens 330, a low insertion loss and high return loss can be realized. Moreover, the optical fiber insertion and fiber receiving opening 312 is bored so that the central axis of this fiber receiving opening 312 coincides with the central axis of the circular conic opening 311, and the optical axis of the optical fiber 320 coincides with the central axis of the spherical lens 330; therefore, it is possible to eliminate the eccentricity of the central axis of the parallel beam emitted from the lens 330 with respect to the central axis of the lens 330. In addition, because there is no need to connect the optical fiber 320 and lens 330 by fusion, a large-scale manufacturing apparatus such as an arc discharge apparatus is not required.

However, the following problems have been encountered in this conventional optical connector 301 shown in FIGS. 6A and 6B.

Specifically, the optical fiber 320 is fastened to the connector main body 310 so that the position of the end of the optical fiber 320 is the focal point of the optical system in this optical connector 301. However, there is no mechanism for positioning the optical fiber 320 in the direction of optical axis. Accordingly, when this optical fiber 320 is fastened to the connector main body 310, it is necessary to determine the position of the tip end of the optical fiber 320 while optically monitoring this optical fiber, so that there is a problem in that it is difficult to position the optical fiber in such a manner that the position of the end of the optical fiber 320 is the focal position of the optical system.

Furthermore, the photocurable resin 340 that fastens the lens 330 to the wall of the circular conic opening 311 is injected into the circular conic opening 311 and cured by photocuring after the lens 330 is inserted on top of this resin. Therefore, there is a danger that gas or foreign matter will be mixed in. If gas or foreign matter is mixed into the photocurable resin 340, there is a problem in that beam is scattered when passing though the photocurable resin 340, so that the transmitted beam is attenuated.

Moreover, because the optical fiber 320 is directly inserted into the fiber receiving opening 312, accidents occur in some cases such as breakage of the optical fiber 320 during handling.

BRIEF SUMMARY

The optical fiber collimator of the present invention is an optical fiber collimator with a housing having a ferrule receiving passageway and a lens receiving portion which is disposed on the front end portion of this ferrule receiving passageway. A central axis is coaxial with the central axis of the ferrule receiving passageway. A spherical lens is fastened to the lens receiving portion and a ferrule is inserted into the ferrule receiving passageway from the rear side and is incorporated with an optical fiber whose front end surface is perpendicular to the central axis. A transparent block having a refractive index that is substantially the same as the refractive indices of the lens and optical fiber is disposed between the lens and the ferrule so that this block contacts the lens, the ferrule, and the optical fiber. A refractive index matching agent having a refractive index substantially the same as the refractive indices of the lens and optical fiber is applied around the contact point between the lens and the block and around the contact surface between the ferrule and the block. The thickness of the block in the direction of beam transmission is set to be the same as the distance to the focal point from the end surface of the lens.

BRIEF DESCRIPTION OF THE DRAWINGS

The invention will now be described with reference to the accompanying figures of which.

DETAILED DESCRIPTION OF THE EMBODIMENT(S)

Figure 1:
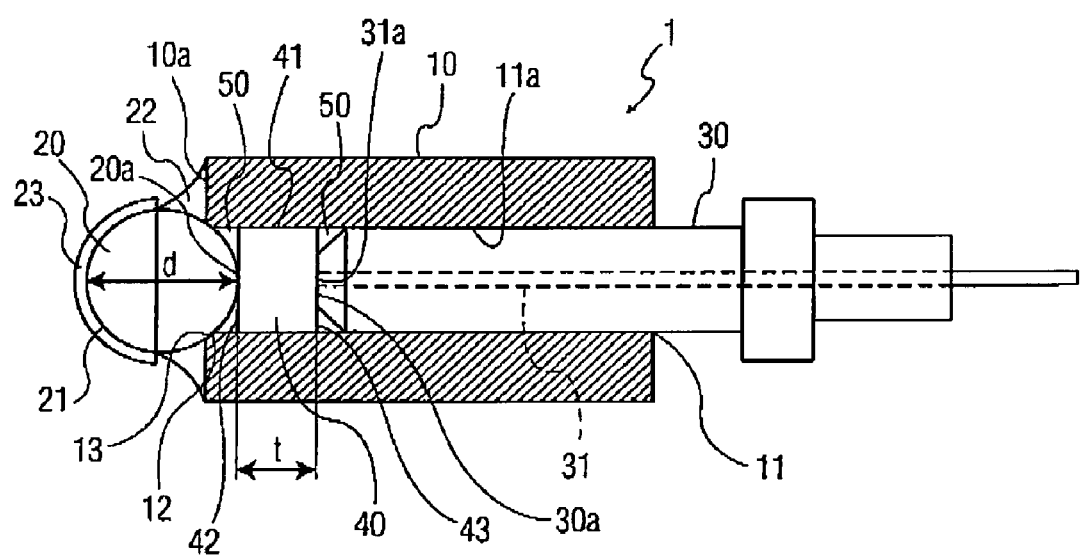
FIG. 1 is a schematic diagram of the optical fiber collimator according to the present invention.

An embodiment of the present invention will be described with reference to the FIGS. 1-3. In FIG. 1, the optical fiber collimator 1 is a collimator that is used in an optical device such as an optical isolator or optical wavelength filter, and comprises a housing 10, a spherical lens 20 having a diameter d, and a ferrule 30 incorporated with an optical fiber 31.

Here, the housing 10 is formed in a hollow cylindrical shape with a ferrule receiving passageway 11 having a cross-sectional circular shape that extends and passes therethrough axially. The housing 10 may be manufactured from a resin into which a glass filler is mixed, but this housing may also be manufactured from a metal such as stainless steel. The straightness of the external diameter of the housing 10 is within a tolerance of 0.003 mm or better, and the eccentricity of the external diameter of the housing 10 and the internal diameter of the housing 10 is 0.05 mm or less. Furthermore, a lens receiving portion 12 having a central axis that is coaxial with the central axis of the ferrule receiving passageway 11 is disposed on the front end portion of the ferrule receiving passageway 11. A rounded bevel 13 that conforms to the external shape of the spherical lens 20 is formed in this lens receiving portion 12. Thus, because a rounded bevel 13 that conforms to the outer surface of the lens 20 is formed in the lens receiving portion 12, no burrs are generated on the lens receiving portion 12, so that the positional deviation of the lens 20 can be avoided as much as possible. Bevelling is not limited to the rounded bevel 13 that conforms to the outer surface of the lens 20; for example, a 45-degree bevel of 0.05 mm or less may also be formed in the lens receiving portion 12. In this case as well, a similar effect can be obtained. Moreover, the perpendicularity of the front end surface 10a of the housing 10 including the lens receiving portion 12 with respect to the internal diameter of the housing 10 is 0.005 mm or better, and the circumferential deviation of the lens receiving portion 12 is 0.003 mm or less.

In addition, the spherical lens 20 having a diameter d is designed to be fastened to the lens receiving portion 12 of the housing 10 by an adhesive 22. The material of the lens 20 is BK7, and the refractive index $n_{20}$ is approximately 1.50. Furthermore, an anti-reflective coating (not shown in the Figures) is provided on the side of the front surface 21 of the lens 20 (portion that protrudes from the housing 10).

Furthermore, the ferrule 30 is formed in a cylindrical shape, and comprises an optical fiber 31 that is internally incorporated on the same axis. The front end surface 30a of the ferrule 30 is polished so that the front end surface 30a of the ferrule 30 is coplanar with the front end surface 31a of the optical fiber 31. The front end surface 31a of the optical fiber 31 is perpendicular to the central axis of this optical fiber 31. This ferrule 30 is designed to be inserted into the ferrule receiving passageway 11 in the housing 10 from the rear side, i.e., on the side opposite from the lens 20. The internal diameter of the housing 10 corresponding to the internal diameter of this ferrule receiving passageway 11 has a parallelism tolerance of 0.003 mm or less with respect to the external diameter of the ferrule 30. Moreover, both corner parts on the front end surface 30a of the ferrule 30 are beveled. The refractive index $n_{31}$ of the optical fiber 31 is approximately 1.45.

In addition, a transparent block 40 is disposed between the lens 20 and ferrule 30 inside the ferrule receiving passageway 11. Here, the term "transparent" means transparent in the wavelength band of beam in which the optical fiber collimator 1 is used. The block 40 is formed in a cylindrical shape which is such that the outer circumferential surface 41 of the block 40 contacts the inner circumferential surface 11a of the ferrule receiving passageway 11, that the front end surface 42 of the block 40 contacts the rear end surface 20a of the lens 20, and that the rear end surface 43 of the block 40 contacts the front end surface 30a of the ferrule 30 and the front end surface 31a of the optical fiber 31. The block 40 has a refractive index $n_{40}$ (=approximately 1.45) substantially equal to the refractive index $n_{20}$ of the lens 20 (=approximately 1.50) and the refractive index $n_{31}$ of the optical fiber 31 (=approximately 1.45). The material of the block 40 is quartz glass. Furthermore, the thickness t of the block 40 in the direction of beam transmission is set to be the same as the distance to the focal point from the rear end surface 20a of the lens 20 that is determined by the diameter d and refractive index $n_{20}$ of the lens 20 and the refractive index $n_{40}$ of the block 40.

Moreover, a refractive index matching agent 50 having a refractive index $n_{50}$ (=approximately 1.45) substantially equal to the refractive index $n_{20}$ of the lens 20 (=approximately 1.50) and the refractive index $n_{31}$ of the optical fiber 31 (=approximately 1.45) is applied around the contact point between the lens 20 and block 40 and around the contact surface between the ferrule 30 and block 40. The refractive index matching agent 50 is composed of a universally known material obtained by mixing a glass filler into a silicone-type base material.

Next, a method for manufacturing an optical fiber collimator 1 will be described.

First, a spherical lens 20 is fastened to a lens receiving portion 12 of the housing 10 by an adhesive 22, with the anti-reflective coating 23 on the lens facing toward the front. As a result, the central axis of the lens 20 coincides with the central axis of the lens receiving portion 12, and also coincides with the central axis of the ferrule receiving passageway 11.

Next, a refractive index matching agent 50 is applied to the rear surface 20a of the lens 20.

Then, a block 40 is inserted into the ferrule receiving passageway 11 from the rear side of the housing 10, and the front end surface 42 of this block 40 is caused to contact the rear end surface 20a of the lens 20.

Afterward, a ferrule 30 and an optical fiber 31 having the front end surfaces 30a, 31a thereof being coated with the refractive index matching agent 50 are inserted into the ferrule receiving passageway 11 from the rear side of the housing 10. The front end surfaces 30a, 31a of the ferrule 30 and optical fiber 31 are caused to contact the rear end surface 43 of the block 40, and the ferrule is fastened to the housing 10. As a result, an optical fiber collimator 1 is completed.

In this optical fiber collimator 1, the central axis of the lens 20 coincides with the central axis of the lens receiving portion 12, also coincides with the central axis of the ferrule receiving passageway 11, and also coincides with the central axis of the ferrule 30 and optical fiber 31 incorporated in this ferrule 30, and the front end surface 31a of the optical fiber 31 is perpendicular to the central axis of this optical fiber 31. Furthermore, the ferrule 30 is inserted into the ferrule receiving passageway 11 to a length of half of this ferrule or greater.

Then, the beam emitted from the optical fiber 31 of the optical fiber collimator 1 passes through the transparent block 40, and is emitted after being converted into a parallel beam by the lens 20. Furthermore, the beam that is incident on the lens 20 conversely passes through the transparent block 40, and is focused on the front end position of the optical fiber 31.

In this optical fiber collimator 1, a transparent block 40 having a refractive index that is substantially the same as the refractive indices of the lens 20 and optical fiber 31 is disposed between the lens 20 and ferrule 30 so that this block 40 contacts the lens 20, ferrule 30, and optical fiber 31, and a refractive index matching agent 50 having a refractive index that is substantially the same as the refractive indices of the lens 20 and optical fiber 31 is applied around the contact point between the lens 20 and block 40 and around the contact surface between the ferrule 30 and block 40. Accordingly, the step difference in the refractive index from the optical fiber 31 to the lens 20 is small, and reflection is small, so that a high return loss can be achieved.

Moreover, the material of the lens 20 is BK7, and the block 40 is transparent. Therefore, absorption of the transmitted beam is small, so that a low insertion loss can be realized. In addition, the block 40 disposed between the lens 20 and ferrule 30 (optical fiber 31) is solid, and is not something that is subsequently cured by means of photocuring or the like. Accordingly, there is no danger of gas or foreign matter being admixed during assembly work, so that the risk of attenuation of the transmitted beam due to scattering can be suppressed to the maximum extent possible.

Furthermore, the central axis of the lens 20 coincides with the central axis of the lens receiving portion 12, also coincides with the central axis of the ferrule receiving passageway 11, and also coincides with the central axis of the ferrule 30 and optical fiber 31 incorporated in this ferrule 30, and the front end surface 31a of the optical fiber 31 is perpendicular to the central axis of this optical fiber 31. Accordingly, it is possible to eliminate the eccentricity of the central axis of the parallel beam emitted from the lens 20 with respect to the central axis of the lens 20. Moreover, even if the transparent block 40 is inclined in a certain range, because the optical step difference is compensated for by filling with the refractive index matching agent 50, there is no generation of eccentricity of the central axis of the parallel beam emitted from the lens 20 with respect to the central axis of the lens 20.

Furthermore, because there is no need to connect the lens 20 and optical fiber 31 by fusion during the manufacture of the optical fiber collimator 1, a large-scale manufacturing apparatus such as an arc discharge apparatus is also not required. Moreover, the thickness t of the block 40 in the direction of beam transmission is set to be the same as the distance to the focal point from the rear end surface 20a of the lens 20 that is determined by the diameter d and refractive index $n_{20}$ of the lens 20 and the refractive index $n_{40}$ of the block 40. Therefore, positioning can be performed so that the position of the front end (tip end) of the optical fiber 31 is the focal point of the optical system, by fastening the lens 20 to the lens receiving portion 12 of the housing 10, inserting the block 40 into the ferrule receiving passageway 11 so as to contact the lens 20, and inserting the ferrule 30 into the ferrule receiving passageway 11 to cause the ferrule 30 and optical fiber 31 to contact the block 40. Accordingly, the end position of the optical fiber 31 can be positioned easily.

In addition, because the optical fiber 31 is incorporated in the ferrule 30, the risk of breakage of the optical fiber during handling can be greatly reduced. Furthermore, because an anti-reflective coating 23 is provided on the front surface 21 of the lens 20, the return loss can be further increased.

Moreover, because the material of the block 40 is quartz glass, it is possible to obtain a high transmissivity in a wide wavelength range, to make attenuation of beam extremely small, and to suppress the risk of the transmitted beam being attenuated even further. Furthermore, because the processing technology of quartz glass is established, the thickness of the block 40 in the direction of beam transmission can be achieved within an arbitrary tolerance, so that the positioning of the end position of the optical fiber can be performed extremely accurately.

Furthermore, in the optical fiber collimator 1, the internal diameter of the housing 10 (corresponding to the internal diameter of the ferrule receiving passageway 11) has a parallelism tolerance of 0.003 mm or less with respect to the external diameter of the ferrule 30, the eccentricity of the external diameter of the housing 10 and the internal diameter of the housing 10 is 0.05 mm or less, and the straightness of the external diameter of the housing 10 is 0.003 mm or better. Moreover, the perpendicularity of the front end surface 10a of the housing 10 including the lens receiving portion 12 with respect to the internal diameter of the housing 10 is 0.005 mm or better, and the circumferential deviation of the lens receiving portion 12 is 0.003 mm or less. In addition, the ferrule 30 is inserted into the ferrule receiving passageway 11 to a length of half of this ferrule or greater. Because of these facts, the position and direction of the central axis of parallel beam emitted from the lens 20 can be determined precisely with respect to the external diameter of the housing 10, which is the external diameter of the optical fiber collimator 1. Therefore, when a pair of optical fiber collimators 1 are used facing each other, the adjustment of the central axis of the parallel beam can be accomplished with reference to the external diameter of the housing 10.

An embodiment of the present invention has been described above. However, the present invention is not limited to this embodiment, and various alterations and modifications can be made.

For example, the material of the lens 20 is not limited to BK7, the material of the block 40 is not limited to quartz glass, and the material of the refractive index matching agent 50 is not limited to a material obtained by mixing a glass filler into a silicone-type base material.

The insertion loss and return loss of the optical fiber collimator 1 shown in FIG. 1 were measured. The results are shown in FIGS. 2 and 3. FIG. 2 is a histogram of the insertion loss of the optical fiber collimator shown in FIG. 1. FIG. 3 is a histogram of the return loss of the optical fiber collimator shown in FIG. 1.

Figure 2:
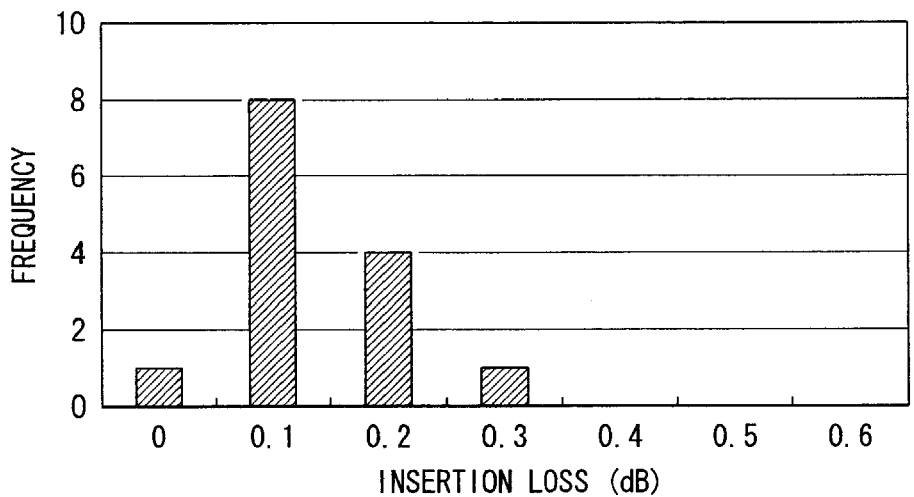
FIG. 2 is a histogram of the insertion loss of the optical fiber collimator shown in FIG. 1.

As is seen from FIG. 2, with the optical fiber collimator 1 shown in FIG. 1, the insertion loss was 0.3 dB or less.

Figure 3:
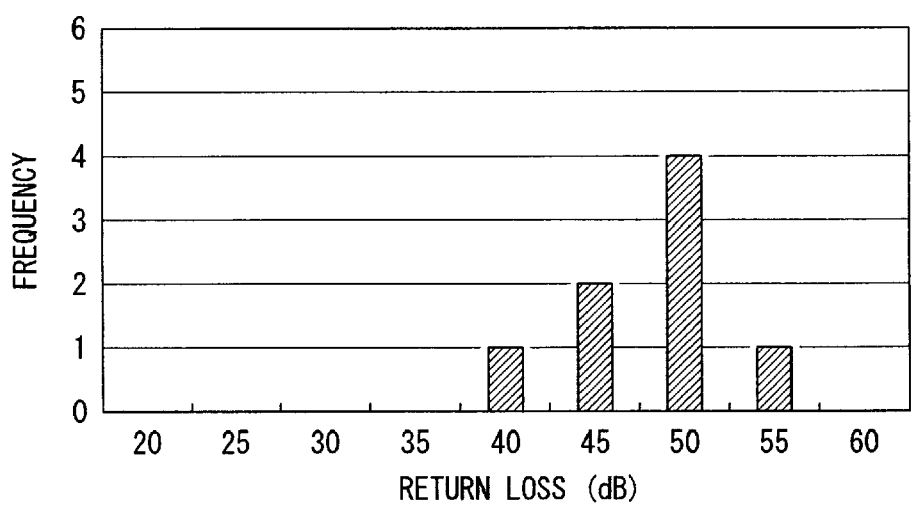
FIG. 3 is a histogram of the return loss of the optical fiber collimator shown in FIG. 1.
Figure 4:
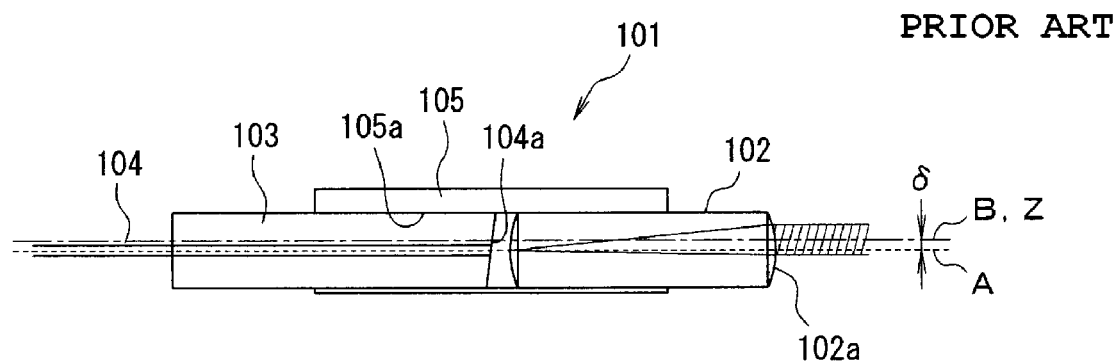
FIG. 4 is a sectional view of a conventional optical fiber collimator.
Figure 5:
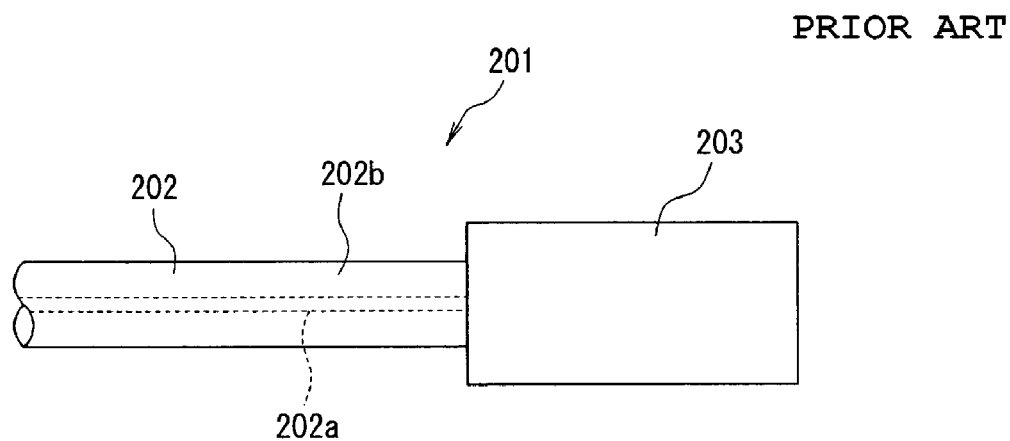
FIG. 5 is a diagram showing the basic construction of a conventional optical fiber rod lens device.
Figure 6A:
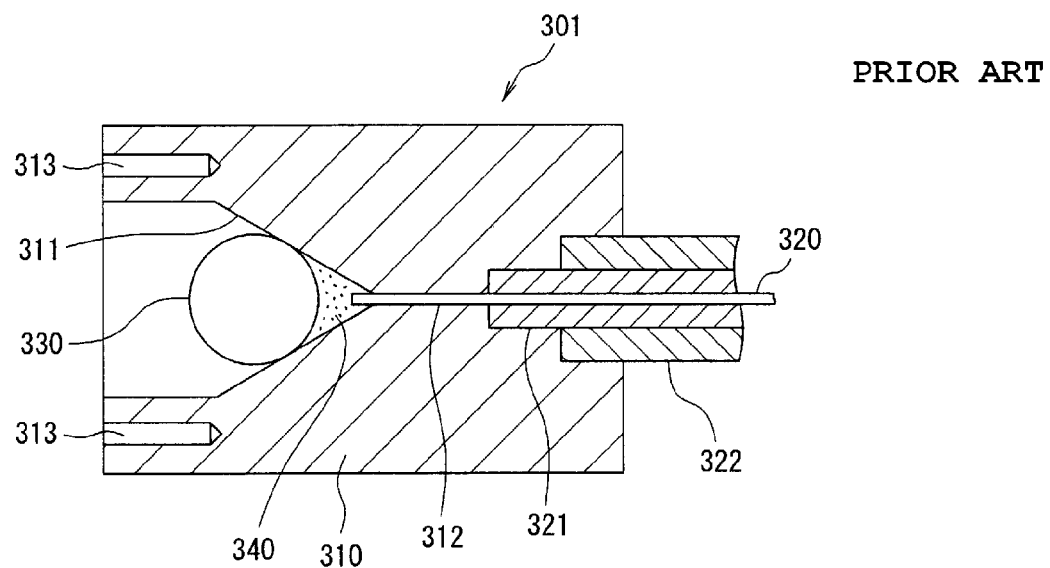
FIGS. 6A and 6B show a conventional optical connector, with FIG. 6A being a sectional view, and FIG. 6B being an explanatory diagram of the optical connector in a use state.
Figure 6B:
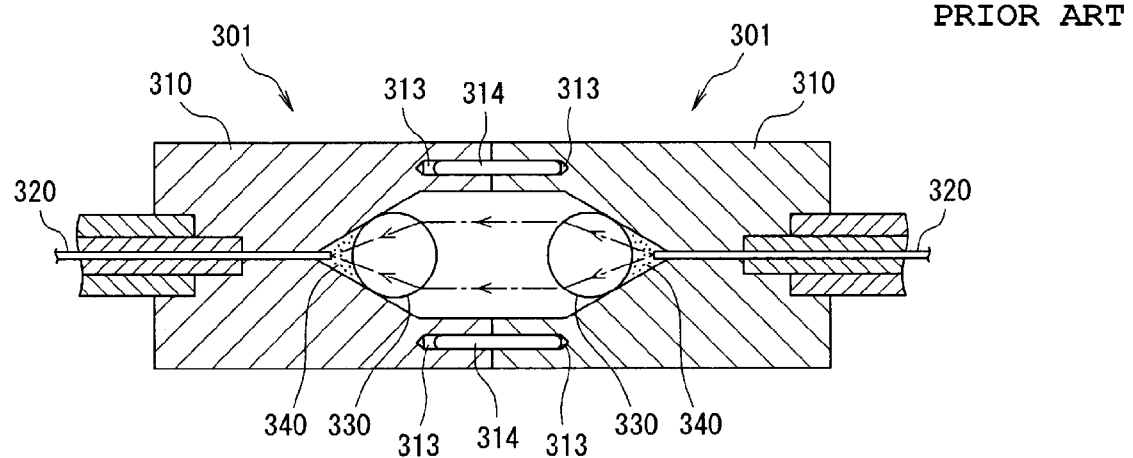

Furthermore, as is seen from FIG. 3, with the optical fiber collimator 1 shown in FIG. 1, the return loss was 40 dB or greater.

What is claimed is:

1. An optical fiber collimator comprising:
   a housing comprising a ferrule receiving passageway extending therethrough, and a lens receiving portion which is disposed on the front end portion of the ferrule receiving passageway, and which has a central axis that is coaxial with the central axis of the ferrule receiving passageway;
   a spherical lens that is fastened to the lens receiving portion by an adhesive such that a center of the spherical lens is positioned outside the housing; and
   a ferrule inserted into the ferrule receiving passageway from the rear side and incorporated with an optical fiber whose front end surface is perpendicular to the central axis, wherein
   a transparent block having a refractive index that is substantially the same as the refractive indices of the lens and optical fiber is disposed between the lens and the ferrule so that the block contacts the lens, the ferrule, and the optical fiber,
   a refractive index matching agent having a refractive index that is substantially the same as the refractive indices of the lens and optical fiber is applied around a contact point between the lens and the block and around a contact surface between the ferrule and the block,
   a thickness of the block in the direction of beam transmission is set to be the same as the distance to a focal point of the lens from the rear end surface of the lens; and
   an outer diameter of the lens is greater than an inner diameter of an inner circumferential surface of the lens receiving portion of the housing.

2. The optical fiber collimator according to claim 1, wherein an anti-reflective coating is provided on a front surface of the lens.

3. The optical fiber collimator according to claim 2, wherein the block comprises quartz glass.

4. The optical fiber collimator according to claim 1, wherein an internal diameter of the housing corresponding to an internal diameter of the ferrule receiving passageway has a parallelism tolerance of 0.003 mm or less with respect to an external diameter of the ferrule, the eccentricity of an external diameter of the housing and the internal diameter of the housing is 0.05 mm or less, a straightness of the external diameter of the housing is 0.003 mm or better, a perpendicularity of the front end surface of the housing including the lens receiving portion with respect to the internal diameter of the housing is 0.005 mm or better, the circumferential deviation of the lens receiving portion is 0.003 mm or less, and the ferrule is inserted into the ferrule receiving passageway to a length of half of the ferrule or greater.

5. The optical fiber collimator according to claim 1, wherein a rounded bevel that conforms to an outer surface of the lens or a bevel of 45 degrees with respect to the central axis of the housing with a length of 0.05 mm or less is formed in the lens receiving portion of the housing.

6. An optical fiber collimator comprising:
a housing comprising a ferrule receiving passageway extending therethrough, and a lens receiving portion which is disposed on the front end portion of the ferrule receiving passageway, and which has a central axis that is coaxial with the central axis of the ferrule receiving passageway;
a spherical lens that is fastened to the lens receiving portion by an adhesive such that a center of the spherical lens is positioned outside the housing; and
a ferrule inserted into the ferrule receiving passageway from the rear side and incorporated with an optical fiber whose front end surface is perpendicular to the central axis, wherein
a transparent block having a refractive index that is substantially the same as the refractive indices of the lens and optical fiber is disposed between the lens and the ferrule so that the block contacts the lens, the ferrule, and the optical fiber,
a refractive index matching agent having a refractive index that is substantially the same as the refractive indices of the lens and optical fiber is applied around a contact point between the lens and the block and around a contact surface between the ferrule and the block,
a thickness of the block in the direction of beam transmission is set to be the same as the distance to a focal point of the lens from the rear end surface of the lens; and
a front end surface of the block and a rear end surface of the block are both substantially planar and substantially parallel to each other while also substantially perpendicular to the central axis of the ferrule receiving passageway;
wherein less than one half of the lens is housed within the housing.

7. The optical fiber collimator according to claim 6, wherein an anti-reflective coating is provided on a front surface of the lens.

8. The optical fiber collimator according to claim 7, wherein the block comprises quartz glass.

9. The optical fiber collimator according to claim 6, wherein an internal diameter of the housing corresponding to an internal diameter of the ferrule receiving passageway has a parallelism tolerance of 0.003 mm or less with respect to an external diameter of the ferrule, the eccentricity of an external diameter of the housing and the internal diameter of the housing is 0.05 mm or less, a straightness of the external diameter of the housing is 0.003 mm or better, a perpendicularity of the front end surface of the housing including the lens receiving portion with respect to the internal diameter of the housing is 0.005 mm or better, the circumferential deviation of the lens receiving portion is 0.003 mm or less, and the ferrule is inserted into the ferrule receiving passageway to a length of half of the ferrule or greater.

10. The optical fiber collimator according to claim 6, wherein a rounded bevel that conforms to an outer surface of the lens is formed in the lens receiving portion of the housing and adjacent a front end surface of the housing.

11. The optical fiber collimator according to claim 6, wherein a bevel of 45 degrees with respect to the central axis of the housing with a length of 0.05 mm or less is formed in the lens receiving portion of the housing and adjacent a front end surface of the housing.

12. An optical fiber collimator comprising:
a housing comprising a ferrule receiving passageway extending therethrough, and a lens receiving portion which is disposed on the front end portion of the ferrule receiving passageway, and which has a central axis that is coaxial with the central axis of the ferrule receiving passageway;
a spherical lens that is fastened to the lens receiving portion by an adhesive such that a center of the spherical lens is positioned outside the housing; and
a ferrule inserted into the ferrule receiving passageway from the rear side and incorporated with an optical fiber whose front end surface is perpendicular to the central axis, wherein
a transparent block having a refractive index that is substantially the same as the refractive indices of the lens and optical fiber is disposed between the lens and the ferrule so that the block contacts the lens, the ferrule, and the optical fiber,
a refractive index matching agent having a refractive index that is substantially the same as the refractive indices of the lens and optical fiber is applied around a contact point between the lens and the block and around a contact surface between the ferrule and the block,
a thickness of the block in the direction of beam transmission is set to be the same as the distance to a focal point of the lens from the rear end surface of the lens; and
wherein a bevel formed in the lens receiving portion of the housing and adjacent a front end surface of the housing contacts an outer surface of the lens.

13. The optical fiber collimator according to claim 12, wherein an anti-reflective coating is provided on a front surface of the lens.

14. The optical fiber collimator according to claim 13, wherein the block comprises quartz glass.

15. The optical fiber collimator according to claim 12, wherein an internal diameter of the housing corresponding to an internal diameter of the ferrule receiving passageway has a parallelism tolerance of 0.003 mm or less with respect to an external diameter of the ferrule, the eccentricity of an external diameter of the housing and the internal diameter of the housing is 0.05 mm or less, a straightness of the external diameter of the housing is 0.003 mm or better, a perpendicularity of the front end surface of the housing including the lens receiving portion with respect to the internal diameter of the housing is 0.005 mm or better, the circumferential deviation of the lens receiving portion is 0.003 mm or less, and the ferrule is inserted into the ferrule receiving passageway to a length of half of the ferrule or greater.

16. The optical fiber collimator according to claim 12, wherein the bevel is rounded and conforms to an outer surface of the lens.

17. The optical fiber collimator according to claim 12, wherein the bevel 45 degrees with respect to the central axis of the housing and has a length of 0.05 mm or less.

18. The optical fiber collimator according to claim 12, wherein a front end surface of the block and a rear end surface of the block are both substantially planar and substantially parallel to each other while also substantially perpendicular to the central axis of the ferrule receiving passageway.

* * * * *

UNITED STATES PATENT AND TRADEMARK OFFICE
CERTIFICATE OF CORRECTION

PATENT NO. : 7,474,822 B2 Page 1 of 1
APPLICATION NO. : 11/683991
DATED : January 6, 2009
INVENTOR(S) : Shigeru Kobayashi et al.

It is certified that error appears in the above-identified patent and that said Letters Patent is hereby corrected as shown below:

In column 10, line 57, "wherein the bevel 45 degrees" should read -- wherein the bevel is 45 degrees --.

Signed and Sealed this

Twenty-eighth Day of April, 2009

JOHN DOLL
*Acting Director of the United States Patent and Trademark Office*